United States Patent [19]

Hochberg

[11] Patent Number: 4,737,448

[45] Date of Patent: Apr. 12, 1988

[54] COLOR IMAGES FORMED BY MULTIPLE DIFFRACTION GRATINGS

[75] Inventor: Eric B. Hochberg, Altadena, Calif.

[73] Assignee: Xerox Corporation, Stamford, Conn.

[21] Appl. No.: 846,523

[22] Filed: Mar. 31, 1986

[51] Int. Cl.[4] .................... G02B 5/18; G02B 27/52; G03C 5/00

[52] U.S. Cl. .................... 430/321; 430/7; 430/290; 430/367; 350/162.17; 350/162.23; 355/32

[58] Field of Search .............. 350/162.17, 162.23; 355/32; 430/290, 7, 321, 367

[56] References Cited

U.S. PATENT DOCUMENTS

| | | | |
|---|---|---|---|
| 755,983 | 3/1904 | Wood | 430/367 |
| 817,569 | 4/1906 | Ives | 430/311 |
| 839,853 | 1/1907 | Ives | 350/162.17 |
| 3,917,378 | 11/1975 | Gale | 350/162.17 |
| 3,947,105 | 3/1976 | Smith | 350/162 SF |
| 3,957,354 | 5/1976 | Knop | 350/162 SF |
| 4,017,158 | 4/1977 | Booth | 350/162 SF |
| 4,211,918 | 7/1980 | Nyfeler et al. | 350/162 SF |
| 4,269,915 | 5/1981 | Moraw | 430/321 X |

OTHER PUBLICATIONS

Anon, "Microfiche in Color Mode by Diffraction", *Electronics*, vol. 49, No. 15, pp. 4E, 6E, Jul. 1976.

K. Knop, "Diffraction Gratings for Color Filtering in the Zero Diffraction Order", Applied Optics, vol. 17, No. 22, Nov. 15, 1978, pp. 3598–3603.

Charles Shapiro, ed., The Lithographers Manual, 4th ed., Chapter Six: Color–Separation Photography, The Graphic Arts Technical Foundation, Inc., Pittsburgh, Pa., 1968, pp. 615 to 618.

Primary Examiner—Paul R. Michl
Assistant Examiner—Cynthia Hamilton
Attorney, Agent, or Firm—Franklyn C. Weiss

[57] ABSTRACT

Method and apparatus for full-color reproduction of a continuous tone color picture or scene using multiple diffraction gratings. The reproduction consists of a plurality of small diffraction gratings (70). A plurality of color separation masks (60) are created for each unique scene. Those picture elements in the original scene containing a given primary color are captured in these transmission-type masks. In certain zones dictated by the separation masks, a plurality of interference patterns are recorded in the properly photosensitized media (70). The spatial freqency of said interference patterns correlates to the primary color to be reproduced. These interference patterns become multiple diffraction gratings when properly developed. The properly photosensitized media may be used as a master for replication purposes. When either master or replica (78) are properly illuminated in white light (76) and properly viewed, the multiple diffraction gratings act to reproduce the colors in the original scene.

12 Claims, 6 Drawing Sheets

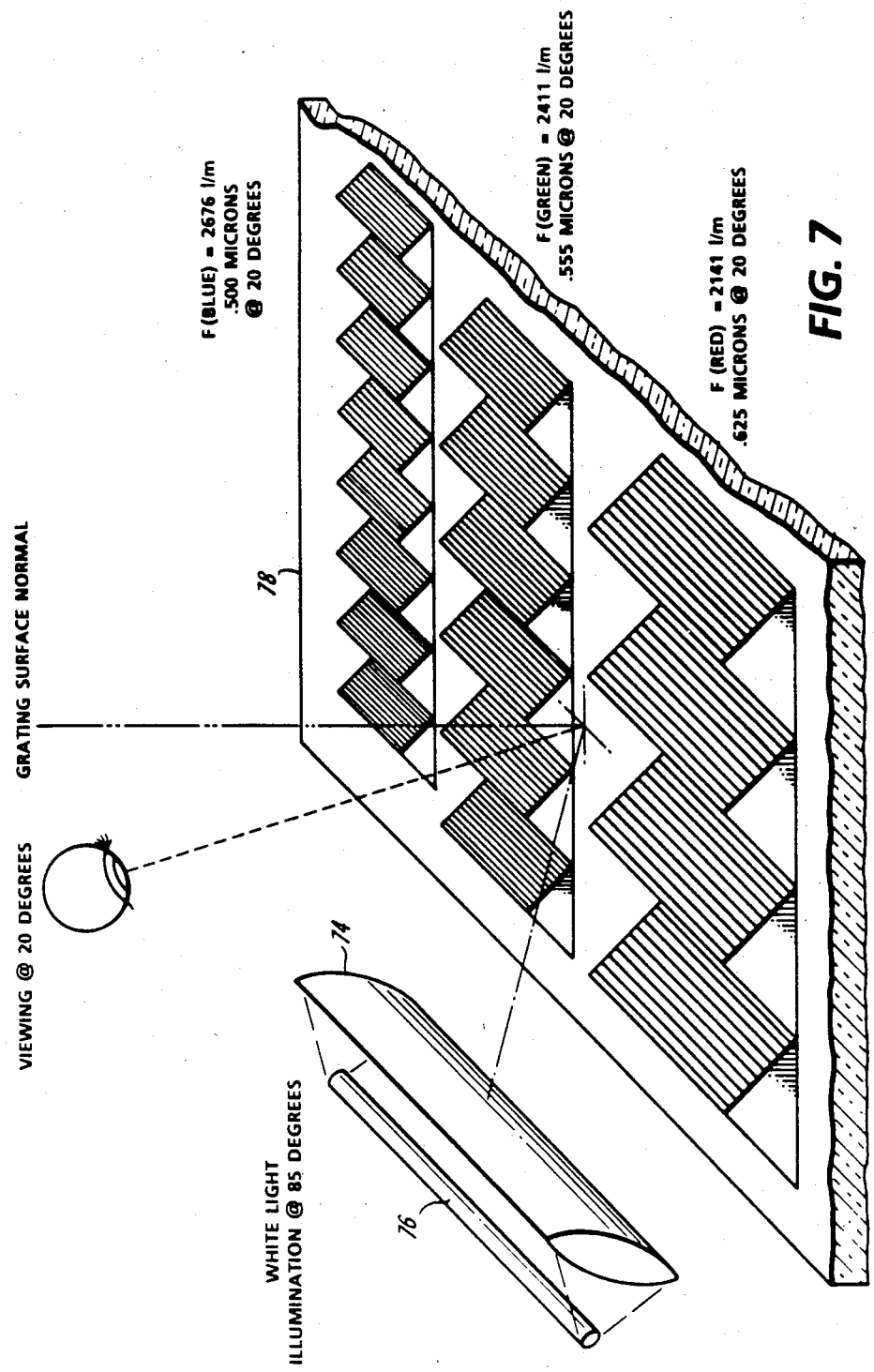

COLOR IMAGES FORMED BY MULTIPLE DIFFRACTION GRATINGS

This invention relates to full color reproduction of continuous tone color pictures or images by the use of diffraction techniques. The reproduction, i.e., the device, consists of a regular array of small planar diffraction gratings of multiple spatial frequencies. The configuration of these arrays is analogous to arrays of color halftone dots. The full color image so created is viewed in white light.

BACKGROUND OF THE INVENTION

In the conventional color halftone, as, for example, in a color television picture, a continuous family of colors is simulated by the superposition or complementary juxtaposition of three "single color" halftones or "separations". These three colors are often referred to as the three "primaries". For example, there may be a red separation, a blue separation, and a green separation.

In magazine or color print lithography, different primary color dots are deposited on the paper or other medium in various sizes or diameters so that the human eye integrates these dots and interprets them as various colors depending upon the dot mix. In photography, color negatives are provided which detect the various colors passing through the lens in a reversal process and, when printed, the various colors become viewable by the human eye. In all of these instances, however, the color perceived is due to either the reflective, transmissive, absorptive and/or radiant characteristics of the media (e.g., toners, inks, dyes, phosphors, pigments, etc.) involved—not the dispersive or diffractive properties.

According to the present invention, a full color image is created and is viewable in white light without the aid of colored inks, toners, sources, guns, or phosphors. A full color reproduction of a color picture, image or scene is realized by means of diffraction techniques. Instead of small, colored dots ("colored" by virtue of their reflective, absorptive, or radiant qualities) the halftone dots here produce their color by means of diffraction. The "dots" in this case are small "microgratings" whose grating spatial frequency has been chosen to diffract a particular portion of the visible spectrum in the direction of the viewer. Using additive primary methods, synthesis of any arbitrary color, (not necessarily a pure spectral color) is possible when the spectra from a plurality of different diffraction gratings are combined in the same plane.

The term "primary grating" refers to grating areas with the same spatial frequency. These "primary gratings" reproduce the red, green, and blue portions of the original image, and may be spatially combined in a number of ways. For example, analogous to color television techniques, a third of the area can be apportioned for the red dots; a third for the green, and a third for the blue. The dots/screens do not overlap. This will be referred to as a "complementary" screen design—one requiring a specially designed halftoning contact screen.

As in conventional color lithographic processes, however, here too it may be possible to allow the gratings to overlap or superimpose just as halftone dots overlap. This approach obviates the need for a special halftoning contact screen—and thus permits the use of conventional color separation methods. Again, just as in conventional color halftone printing methods, dot size will determine the net tone value of that particular halftone cell or dot.

DESCRIPTION OF THE DRAWINGS

For a more complete understanding of the invention, reference may be had to the following detailed description of the invention in conjunction with the drawings wherein:

FIG. 7 is a schematic representation of a person viewing a multiple diffraction grating prepared in accordance with the present invention.

DETAILED DESCRIPTION OF THE INVENTION

In this invention, the individual halftone patterns consist of a unique variety of "halftone dot" in which the variously sized dots are not colored per se, but are small diffraction gratings. The spatial frequency of a given diffraction grating is chosen to diffract a particular wavelength into a particular angle. The other screens would consist of dots having different diffraction grating frequencies designed to diffract other wavelengths into the same viewing angle.

Figure 1:
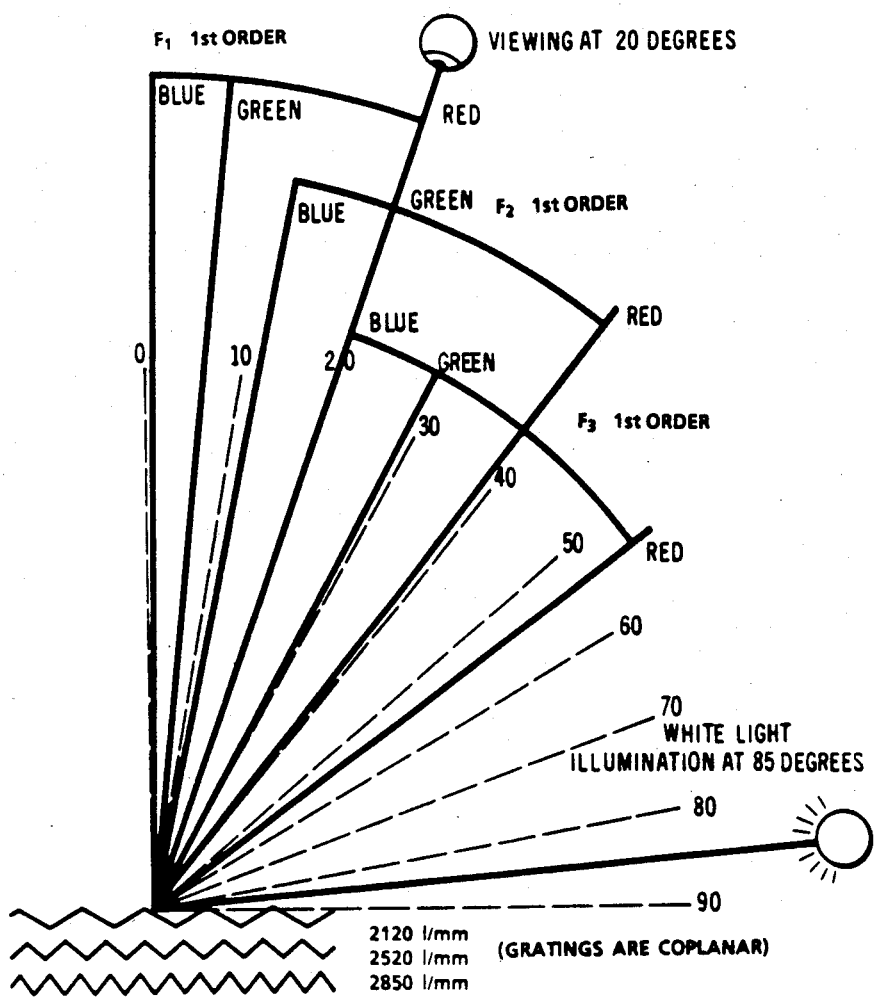
FIG. 1 shows the dispersion characteristic of three coplanar diffraction gratings of the present invention.

FIG. 1 of the present application discloses one variation on the multiple diffraction grating technique of the present invention. F1, F2, and F3 are different reflective diffraction gratings all in the same plane, but not necessarily superimposed over one another.

White light illumination is incident on this device near grazing incidence; i.e, at 85 degrees from the grating surface normal. One then finds three characteristic spectra associated with each of the three grating frequencies. The visible blue-to-red portions of the first-order spectra are shown for each grating in the figure. The gratings have been designed in such a way that at a 20 degree viewing angle, the (red) 630 nm light from F1 coincides with both the (green) 530 nm light from F2 and the (blue) 470 nm light from F3.

Table 1 below describes a particular combination of three gratings designed for illumination at 85 degrees and viewing at 20 degrees. 630 nm light is chosen for red, 530 nm light for green and 470 nm light for the blue.

Table 2 below describes a particular combination of three gratings designed for illumination at 85 degrees and viewing at 0 degrees. (It should be noted that the first order diffracted light due to a beam incident at plus 85 degrees and the minus first-order diffracted light due to a beam incident at minus 85 degrees both coincide at zero degrees—the design viewing angle. This symmetrical design enables one to increase the relative illumination incident on the gratings.)

TABLE 1 illumination at +80 degrees;
nominal viewing angle = +20 degrees
DIFFRACTION ANGLE, degrees

| | RED 630 nm | GREEN 530 nm | BLUE 470 nm | DISPERSION |
|---|---|---|---|---|
| | GRATING FREQUENCY 1/mm | | | |
| F1 = 2120 | 20 | 7.5 | 0.1 | 20 |
| F2 = 2520 | 36.5 | 20 | 11.0 | 26 |
| F3 = 2850 | 52.9 | 30.9 | 20 | 33 |

TABLE 2 illumination at plus or minus 80 degrees;
nominal viewing angle = 0 degrees
DIFFRACTION ANGLE, degrees

| | RED 630 nm | GREEN 535 nm | BLUE 470 nm | DISPERSION |
|---|---|---|---|---|
| | GRATING FREQUENCY, 1/mm | | | |
| F1 = 1563 | 0° | −8.5° | −14.5° | 14.5° |
| F2 = 1841 | 10.1° | 0° | −6.9° | 17.0° |
| F3 = 2095 | 19.6° | 7.8° | 0° | 19.6° |

In the example described above in Table 1, an observer looking at these three gratings at an angle of 20 degrees from the grating normal will, with 85 degree illumination, see a new color which is the combination of the "red" portion of the incident spectrum dispersed by frequency F1 grating areas, the "green" portion of the spectrum dispersed by frequency F2 grating areas, and the "blue" portion of the incident spectrum dispersed by frequency F3 grating areas. The actual color perceived due to any single grating alone will be dependent upon its size, and shape, its grating spatial frequency, its diffraction efficiency and the viewing and illumination conditions. Reviewing the parameters which will influence the appearance of this device are:
the particular observer,
grating frequency (lines per millimeter),
grating size and shape,
grating diffraction efficiency,
viewing angle,
viewer distance to device,
illumination spectral content,
illumination angle of incidence,
 illumination source size.

In the present embodiment, as in conventional halftone techniques, dot area determines the "quantity of color" that will be viewable by an observer. By virtue of the relatively small size of these "diffraction dots" and the close proximity of dots of different spatial frequencies, a new color will be perceived from this combination of three relatively pure spectral colors.

A master multiple diffraction grating color reproduction can be generated by at least three different techniques: First, a computer generated technique in which the separation masks are synthesized digitally and which may include conventional electronic color separation methods; second, in which the separation masks are created using a specially designed halftone contact screen; and third, similar to the second except for the use of a standard halftone contact screen. The second technique is described in detail below.

(In the third process method, the grating exposures are allowed to overlap, as in conventional color halftoning techniques. In so doing, it is expected that diffraction efficiency of any given grating will be compromised as double and triple exposures in the same place on the master plate would be likely. Such an approach, however, lends itself to the use of existing halftoning materials and techniques; that is, no specially designed halftone contact screens would be required.)

A. Create separation masks for each unique color original

The process begins, for example, with a continuous tone color photograph. Since it is attempted to form a colorimetrically faithful reproduction of this continuous tone color photograph, needed to be known are the component colors with which the multiple diffraction grating color image will be "played back". If the reproduction will be played back using three diffraction gratings which, for example, diffract red light centered at wavelength W1, green light centered at wavelength W2, and blue light centered at wavelength W3, all into a particular viewing angle, only then can the separation masks be properly created.

Figure 2:
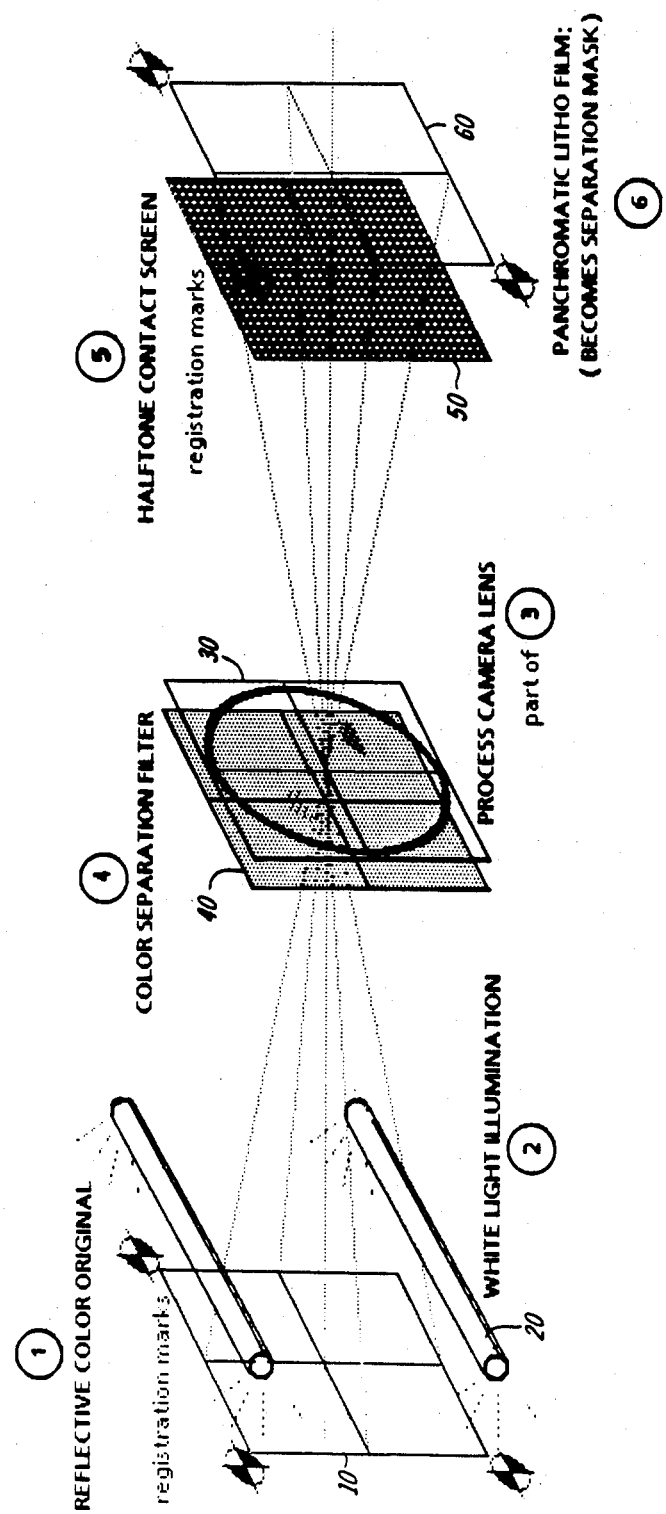
FIG. 2 is a schematic diagram of the present invention showing the creation of the separation masks.

The separation masks, which will be used in the recording of the multiple diffraction grating master, can be created in a manner similar to the way conventional color halftone screen separations are now created. The major components that are seen in FIG. 2 are:
The original color picture 10;
White light illumination 20;
Conventional process camera with registration means for both object, contact screen, and film. 30;
Specially designed color separation filter 40;
Specially designed transmission type contact halftone screen 50;
High contrast panchromatic lithographic film 60.

The original color picture 10 is placed in front of the process camera 30 which forms a real image on the lithographic film 60, upon being illuminated by white illumination source 20.

Figure 6A:
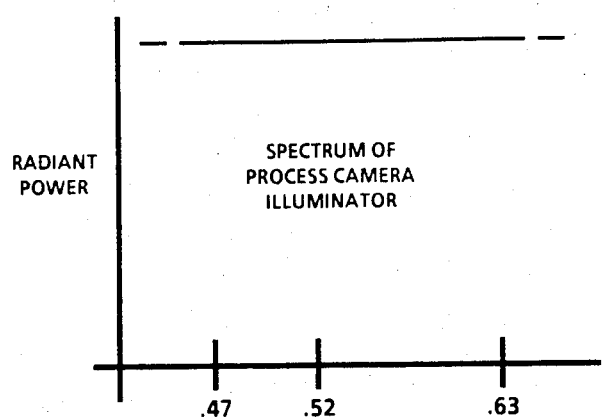
FIGS. 6A to 6C are representative curves showing the various spectral characteristics of the illumination system, color separation filters and diffraction gratings.
Figure 6B:
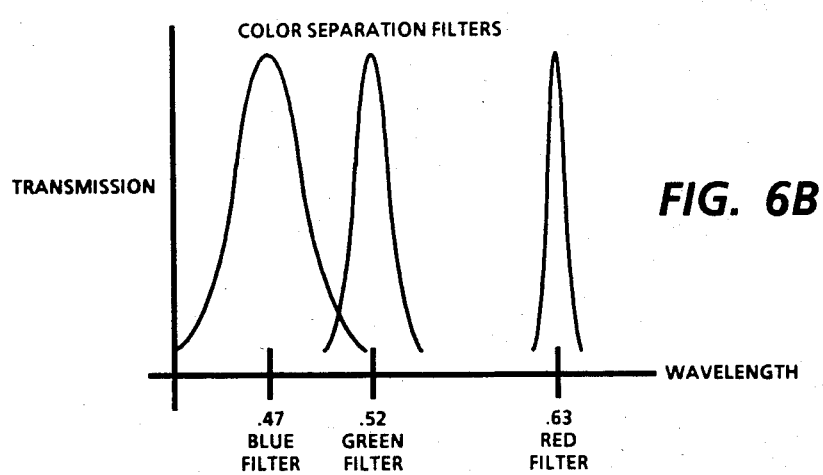
Figure 6C:
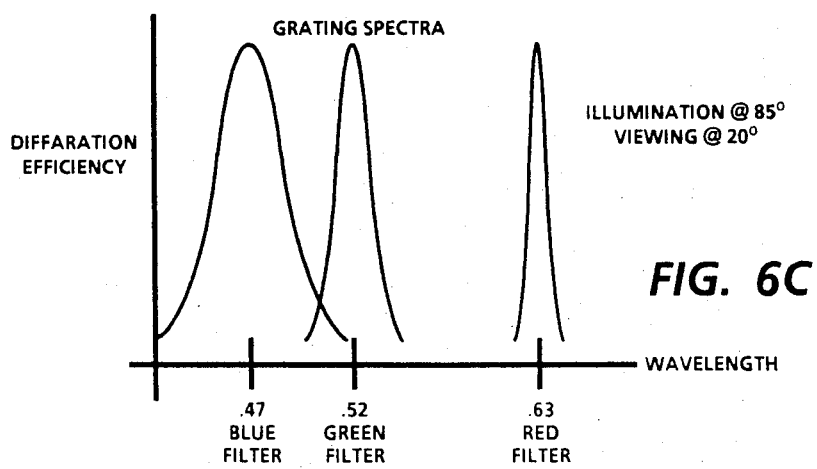

The specially designed, transmission-type color separation filter 40 is placed in front of the process camera lens. Referring to FIG. 6, the color separation filters must be designed with due consideration to the spectra of the primary grating that will be used in playback. To first order, the transmission spectrum of the color filter must match the diffraction efficiency spectrum of the particular grating.

As schematically shown in FIG. 6, the spectral transmission characteristic of these filters will be functionally similar to the diffraction efficiency curves of the primary gratings.

Assuming both a positive master and a positive lithographic film 60, filter 40 must transmit the particular spectral color to be rendered when this separation is played back.

The specially designed transmission-type contact halftone screen 50 is placed directly in registration and in contact with the lithographic film 60 to be exposed. That portion of the white light illumination 20 spectrum, both reflected by the object and transmitted by the filter, will result in the corresponding areas on the positive lithographic film to become clear after passing through the halftone screen 5.

Figures 3A, 3B, 3C:
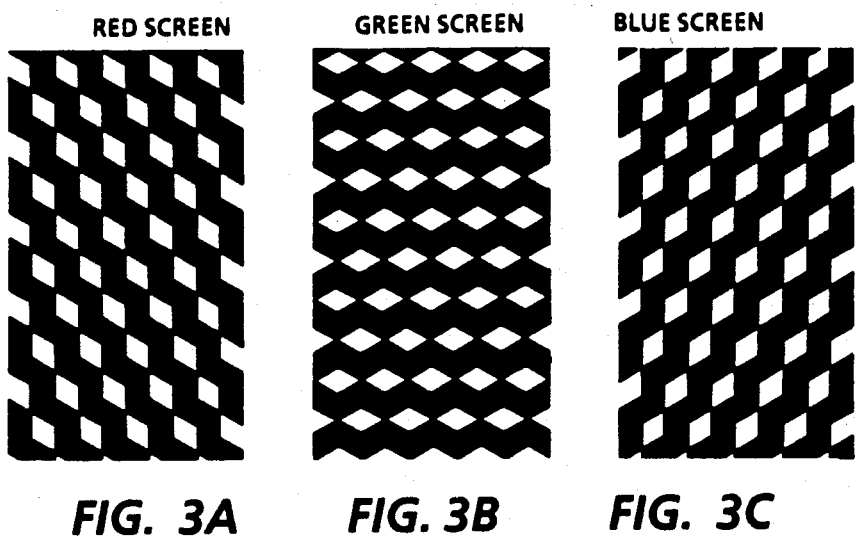
FIGS. 3A to 3C are diagrams showing complementary "red", "green", and "blue" halftone contact screens.

FIGS. 3A, 3B, and 3C schematically show three possible "complementary" halftone contact screens. ("Complementary" here refers to the fact that one-third of the final image area is dedicated to separating out the red primary content in the original, one-third of the final image is dedicated to separating out the green primary content in the original, and one-third of the final image is dedicated to separating out the blue primary content in the original.)

It is noted that in all of these designs, at least two thirds of the area of the mask is opaque so as not to expose areas apportioned for the other screens; the remaining one third area consists of relatively clear zones with a sinusoidal transmission cross section. Diamond zone shapes are shown in FIGS. 3A-3C; while other geometries are, however, possible as in conventional halftoning, the resulting clear lithographic dot size will be a direct function of the exposure. It is noted that when any two screens are superimposed in registration there is no transmission.

Assuming a positive working lithographic film, the clear zones in each primary separation mask will correspond to only those zones in the original with spectral content in the transmission band of the filter; the size of these zones will be dictated by the following product:

DOT SIZE = $INTEN_{source}(dw) \times R_{object}(dw) \times T_{filter}(dw) \times T_{screen}(dw) \times SENS(dw)$, where:

$INTENSITY_{source}(dw)$ = power spectrum of the source $R_{object}(dw)$ = spectral reflectivity of the object at a given position $T_{filter}(dw)$ = spectral transmission of the separation filter $T_{screen}(dw)$ = spectral transmission characteristics of the contact halftone screen at position $SENS(dw)$ = spectral sensitivity of lithographic film.

"dw" is the narrow spectral band over which all the above parameters have relatively constant values.

The second and third separation masks are formed similarly, each will use its own color filter and either a new contact halftone screen, or the same screen with a different angular orientation.

We now have a complete set of three separation masks 60 for the reproduction of the original color picture, image, or scene.

Figure 4:
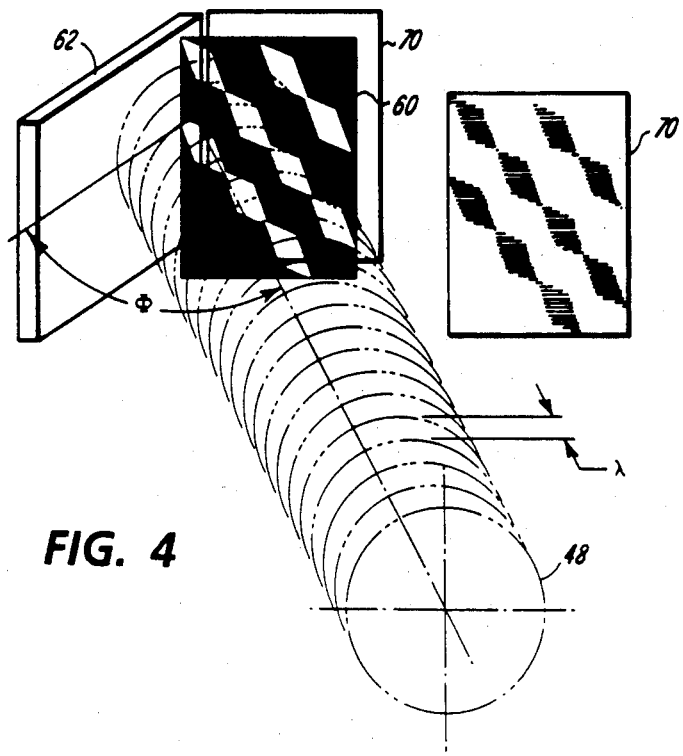
FIG. 4 is a schematic diagram of the present invention utilizing a Lloyd's mirror arrangement to record the multiple diffraction gratings.

B. Using interferometric techniques, record gratings on a single master in transmission zones of separation masks On a single lithographic plate then, FIG. 4, with the appropriate photosensitive coating, an interferometric diffraction grating exposure is made through each of the lithographic type transmission separation masks described above. A "Lloyd's mirror" arrangement 62 in conjunction with a vacuum platen, not shown, as shown in FIG. 4 can be used to easily "impress" a different diffraction grating through each of the three masks. The masks are used in registered contact with the photosensitive coating on plate 70 and thus act as "stencils", allowing the grating to be recorded only in the areas corresponding to the clear portions of the mask. In this example, three masks would require three separate, registered, exposures.

Figure 5B:
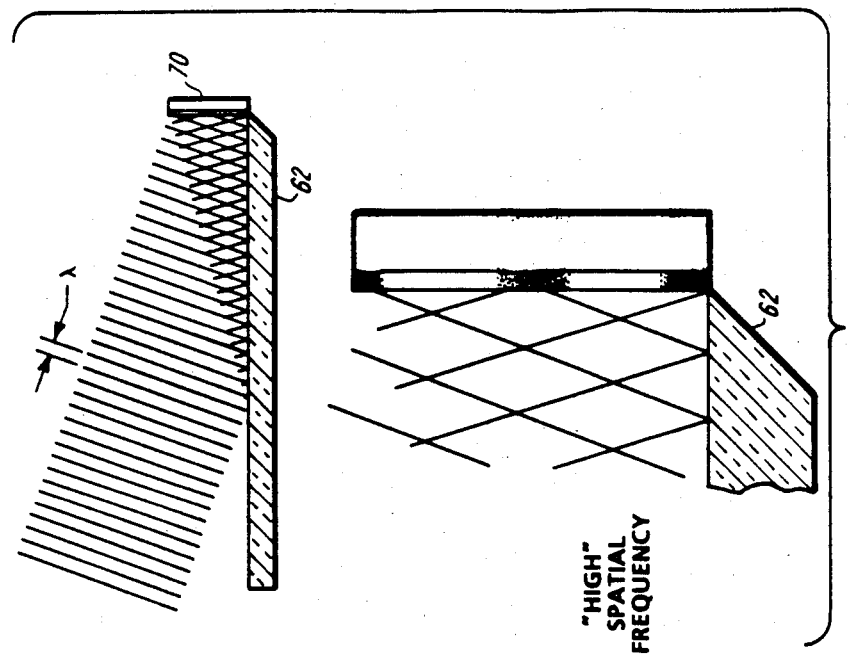
FIGS. 5A and 5B are a schematic diagrams of the recording of the different grating frequencies utilizing the Lloyd's mirror arrangement.
Figure 5A:
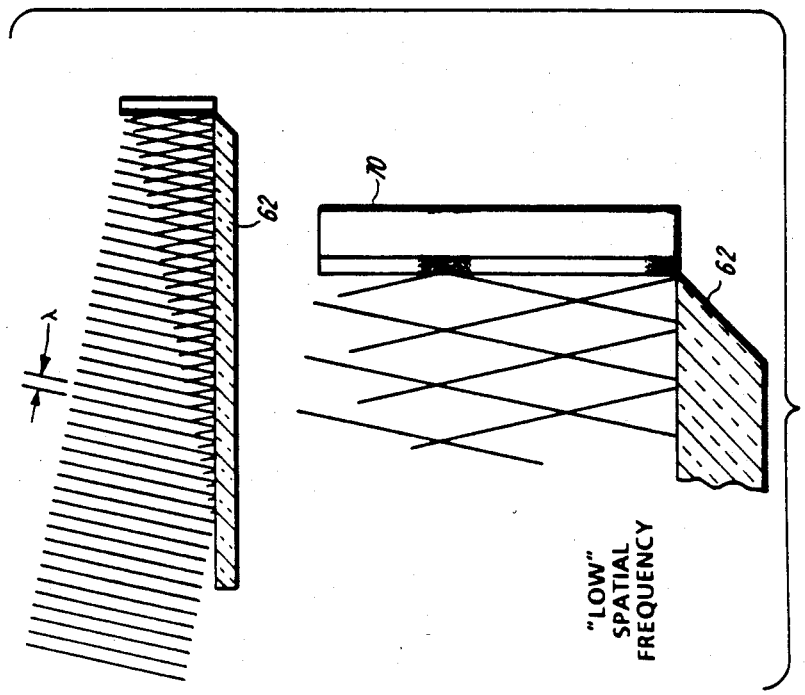

The Lloyd's mirror configuration produces an interference pattern between two monochromatic beams that are derived from the same source/laser 48. Linear interference fringes (bands of light and dark) are thus recorded in the positive working photosensitive material 70 which is placed in the interference zone as shown in FIGS. 5A and 5B. At this point the gratings-to-be may be thought of as being latent images of the interference patterns. The single master plate will undergo three serial exposures—each interferometric exposure with a particular separation mask and a particular grating frequency.

C. Develop master plate

Utilizing positive photoresist as the photosensitive media, and following proper development, the grating latent images are transformed into surface relief patterns which function as diffraction gratings of three discrete spatial frequencies.

The exposure, development, and replication processes will be optimized with respect to grating diffraction efficiency and with due consideration to the following parameters:

grating type: either reflection or transmission,
viewing and illumination angles,
wavelength of interest.

D. View master under proper illumination and viewing conditions

Under white light illumination 76, the multiple diffraction grating reproduction 78 will be visible in reflection even in the absence of a reflective coating. In FIG. 7, a linear, white light line source of illumination is shown. A long tungsten filament lamp would be such a source. Cylindrical collimation optics 74 are schematically shown. These would be designed to provide a collimated flood of white light onto the grating halftone at a single narrow angle of incidence. In FIG. 7, the angle of incidence shown is approximately 85 degrees as calculated in the above examples.

The photoresist on glass device created above then becomes the master from which conventional electroforming techniques can be applied to mass produce full-color replicas of the original color image or scene. The above process is repeated for each new color original or scene.

E. Electroform embossing tool from above master

Conventional nickel electroforming and embossing-on-aluminized-mylar techniques may now be applied to make multiple replicas from the above master. These are the same techniques currently being used to make reflective hologram replicas.

These flexible sheets of embossed aluminized gratings, as before, are best viewed under the design illumination and viewing conditions.

While the invention has been described with reference to specific embodiments, it will be understood by those skilled in the art that various changes may be made and equivalents may be substituted for elements thereof without departing from the true spirit and scope of the invention. In addition, many modifications may be made without departing from the essential teachings of the invention.

What is claimed is:

1. A method of full color reproduction of continuous tone color pictures, images or scenes by the use of diffraction techniques comprising:

illuminating (20) a color picture or scene (10) to be reproduced, separating (40) the reflected light from said picture or scene into its primary component colors, imaging (30) said separated component colors one at a time onto and thereby exposing a separate photosensitive film (60) for each component color, previously covering each of said photosensitive films with an associated individual halftone contact screen (50), one for each component color, each of said films comprising individual separation masks, one for each component color corresponding to the primary component colors reflected from said picture or scene, exposing (70) a photosensitive plate with a characteristic interference pattern for each primary component color through said individual separation masks to form latent multiple diffraction gratings on said photosensitive plate representative of the primary colors reflected from said picture, image or scene, and developing said plate so as to convert the latent interference patterns into surface relief patterns with multiple spatial frequencies which exhibit characteristic diffraction effects and thereby reproduce the original color image, picture or scene.

2. The method as set forth in claim 1 further comprising illuminating (76) said photosensitive plate with white light so as to reveal said color image by diffracted light.

3. The method as set forth in claim 2 further comprising placing said white light illumination source at a predetermined angle to said photosensitive plate, and viewing said light at a second predetermined angle so as to reveal the true colors in the original picture, image or scene.

4. The method as set forth in claim 1 further including replicating said multiple diffraction grating by using said photosensitive plate as a master of said picture, image or scene.

5. A multiple diffraction grating in the form of a plurality of halftone areas on a substrate (70), each of said halftone areas having at least one of a plurality of diffraction grating frequencies, such that the primary component colors in an original picture, image, or scene are reproduced when properly illuminated and viewed, wherein said plurality of grating areas comprises a first pattern of diffraction grating areas with a first grating spatial frequency representative of a first primary color, a second pattern of diffraction grating areas with a second grating spatial frequency representative of a second primary color, and a third pattern of diffraction grating areas with a third grating spatial frequency representative of a third primary color.

6. The multiple diffraction grating as set forth in claim 5, wherein said substrate comprises a photosensitive plate upon which the plurality of interference patterns have been recorded and developed to reveal said diffraction gratings.

7. The multiple diffraction grating as set forth in claim 5 wherein said substrate serves as a master for the purpose of making replicas of said multiple diffraction grating.

8. Apparatus for making a full color reproduction of continuous tone color pictures, images or scenes by the use of diffraction techniques comprising:

means for illuminating (20) a color picture or scene (10) to be reproduced, means for separating (40) the reflected light from said picture or scene into its primary component colors, means for imaging (30) said separated component colors one at a time onto and thereby exposing a separate photosensitive film (60) for each component color, means for previously covering each of said photosensitive films with an associated individual halftone contact screen (50), one for each component color, each of said films comprising individual separation masks, one for each component color corresponding to the primary component colors reflected from said picture or scene, means for exposing a photosensitive plate (70) with a characteristic interference pattern for each component color through said individual separation masks to form latent diffraction gratings on said photosensitive plate representative of the colors reflected from said picture, image or scene, and means for developing said plate so as to convert the latent interference patterns into surface relief patterns with multiple spatial frequencies which exhibit characteristic diffraction effects and thereby reproduce the original color image, picture or scene.

9. The apparatus as set forth in claim 8 further including means for illuminating said photosensitive plate means with white light (76) so as to reveal said color image by diffraction light reproduction.

10. The apparatus as set forth in claim 9, wherein said illuminating means is placed at a predetermined angle to said photosensitive plate means such that the true component colors in the original scene or picture will be reproduced when viewed at a second predetermined angle.

11. The apparatus as set forth in claim 8 further including means for replicating said multiple diffraction grating by using said photosensitive plate as a reproduction master of said picture, image or scene.

12. The multiple diffraction grating as set forth in claim 5, wherein said plurality of grating areas exhibit characteristic diffraction effects such that said multiple diffraction grating is a viewable representation of said original color picture, image, or scene.

* * * * *